United States Patent [19]

Ohannes et al.

[11] Patent Number: 5,521,789
[45] Date of Patent: May 28, 1996

[54] BICMOS ELECTROSTATIC DISCHARGE PROTECTION CIRCUIT

[75] Inventors: James R. Ohannes, Portland; Stephen W. Clukey, South Portland; E. David Haacke, Westbrook; Roy L. Yarbrough, Hiram, all of Me.

[73] Assignee: National Semiconductor Corporation, Santa Clara, Calif.

[21] Appl. No.: 213,661

[22] Filed: Mar. 15, 1994

[51] Int. Cl.⁶ .................................................. H02H 9/04
[52] U.S. Cl. ............................ 361/111; 361/56; 361/91
[58] Field of Search ............................ 361/91, 111, 56

[56] References Cited

U.S. PATENT DOCUMENTS

| | | | |
|---|---|---|---|
| 4,400,711 | 8/1983 | Avery | 357/43 |
| 4,527,213 | 7/1985 | Ariizumi | 361/56 |
| 4,875,130 | 10/1989 | Huard | 361/56 |
| 4,987,465 | 1/1991 | Longcor et al. | 357/23 |
| 5,276,582 | 1/1994 | Merrill et al. | 361/111 |

Primary Examiner—A. D. Pellinen
Assistant Examiner—Michael J. Sherry
Attorney, Agent, or Firm—Thomas L. Bohan; Chris A. Caseiro

[57] ABSTRACT

An enhanced bipolar-transistor apparatus for protecting electronic devices from electrostatic discharge damage. The apparatus is built around a bipolar transistor coupled between a power rail and the circuit to be protected. The protection is based on the high-current-capacity path through the bipolar transistor which is opened up either by collector-to-emitter punch-through in the bipolar transistor or by the bipolar transistor going into normal conduction upon being turned on by a switch coupled to the base of the bipolar transistor. In the preferred embodiment the switch is a MOS transistor that is designed to undergo source-to-drain breakdown at a fixed threshold voltage, whereupon it activates the bipolar transistor which in turn discharges the overvoltage. In this way the advantages of the high-current-capacity bipolar transistor are obtained without the concern that fabrication vagaries will prevent the bipolar transistor from providing needed protection, such as is the situation where the punch-through phenomenon alone is relied on.

20 Claims, 2 Drawing Sheets

5,521,789

BICMOS ELECTROSTATIC DISCHARGE PROTECTION CIRCUIT

BACKGROUND OF THE INVENTION

1. Field of the Invention

The present invention relates to apparatus for protecting integrated circuits (ICs) against electrostatic discharge (ESD) damage. More particularly, this invention relates to a protection circuit using a single bipolar guarding transistor to divert dangerous charge accumulations away from the input of ICs. The bipolar guarding transistor either undergoes punch-through in the presence of an over-voltage or is turned on by base current delivered by a backup switch coupled between the input node and the bipolar guarding transistor's base node.

2. Description of the Prior Art

The risks to ICs posed by accumulations of electrostatic charge are well known. Although they generally constitute but a small quantity of charge, such accumulations can result in quite high voltages and thus high risk to circuit elements through which they may be discharged.

ESD protection strategies have generally involved providing a voltage-sensitive switch through which the accumulated charge can be diverted and then drained harmlessly. Such a switch must be implemented so that legitimate data signals are not also diverted. Typical data signals range from a logic-high of five volts to a logic-low of 0 volts. The transient voltage spikes against which protection is sought are of varying magnitudes. Any ESD protection device must ensure that all voltages exceeding the circuit's damage-threshold level—which may be just a few volts above the logic-high level—are diverted, while voltages at the logic-high level and below are left unaffected. The other requirement, of course, is that the ESD protection work extremely fast; it will do no good to divert a 20-volt pulse after that pulse has permanently damaged the circuit. It will also hamper normal circuit performance if the protection device requires so long to discharge the spike that the circuit input is "pegged" at a fixed voltage for a prolonged time, even if that voltage does not cause permanent damage.

FIG. 1 shows a prior-art ESD protection device depending on discharge through a forward-biased diode, either to the high-potential power rail or to the low potential power rail, depending on the polarity of the spike. Positive spikes that exceed $V_{cc}$ plus the voltage drop across a forward-biased diode, D1, will be diverted to the high-potential power rail. Negative spikes reaching a magnitude exceeding the voltage drop across a forward-biased diode, D2, will be diverted to the low-potential power rail. In both instances, the dangerous voltage is dropped across the input resistor R, and the actual circuit input node is subjected to electrostatic pulses exceeding $V_{cc}$ or dropping below ground by no more that the drop across a forward-biased p-n junction. The shortcoming of this circuit is that the RC time-constant established by the input resistor and the capacitance or the spike-diverting diode extends the discharge period, and hence the period the circuit input is pegged, hampering the normal response of the circuit to incoming signals.

Other prior-art circuits, such as the one shown in FIG. 2, use bipolar transistors as the operative circuit element in the protection. Then the switching event is the collector-to-emitter breakdown ("punch-through") of the bipolar guarding transistor. These units avoid the time-constant retardation of the FIG. 1 circuit and break down very quickly when exposed to voltages above their breakdown threshold. Furthermore, bipolar transistors, whether in punch-through or in ordinary conduction, can carry a very high current, a necessity for disposing of the electrostatic buildup before it can cause damage. The weakness of this type of protection is its reliance on the bipolar transistor's breakdown voltage. It is well-known that in the IC fabrication process it is extremely difficult to ensure a narrow range of punch-through voltages of bipolar transistors. This means that across a production run the punch-through voltage for a particular bipolar transistor will display a scatter, with a significant proportion breaking down either at voltages lower than the design breakdown voltage or at voltages considerably higher than called for. This is in the nature of bipolar transistors produced by IC fabrication processes, and it obviously is a serious problem when the ESD protection is provided by a bipolar transistor alone, as in FIG. 2. The consequences include both circuits in which the protective mechanism kicks in at too low a voltage, in effect cutting off logic-high data signals, and circuits in which the protective mechanism does not kick in even though exposed to voltage spikes that are high enough to destroy the circuit being guarded.

Better results can be obtained over the bipolar punch-through voltage by tying the transistor base to its emitter through a resistance R. This can prevent the low-voltage (premature) breakdowns that divert legitimate signals. It also helps cut down on the number of units in which the punch-through voltage is too high. However, even this approach cannot ensure that every single unit will contain the needed ESD protection; some units will be destroyed because the bipolar transistor failed to breakdown at voltages above the damage threshold.

MOS transistors are subject to much tighter production controls; in particular the source-to-drain breakdown voltage can be predicted with a high degree of confidence. Thus, it might seem that the ESD problem could be solved by substituting a MOS transistor for the bipolar one; indeed, there are prior-art circuits in which ESD protection is provided by a MOS transistor connected between the line-to-be-protected and one of the power rails. This solves the problem of diverting all voltage pulses above a well-defined threshold. Unfortunately, the MOS transistors' low current-carrying capacity means that they generally require too long to discharge a potentially-lethal charge. This appears to be true also of the other voltage-sensitive switches capable of being manufactured as part of ICs while nevertheless being held to within a narrow range of switching voltages.

Therefore, what is needed is some means of backing up that minority of bipolar guarding transistors which fail to undergo punch-through at a sufficiently low voltage, some means of causing those guarding transistors to provide a high-capacity current path for input voltages which do not exceed the punch-through voltage of the guarding transistors.

SUMMARY OF THE INVENTION

The present ESD protection invention combines the high-current-capacity of the bipolar guarding transistor with the precision breakdown control of other types of switches. In this manner, the efficient discharge protection of the bipolar transistor is made available with an assurance that manufacturing vagaries will not produce some units where the ESD protection does not kick in until after the circuit has been destroyed. In particular the precision devices are used as safeguard switches that will turn on the bipolar guarding transistor should that device fail to undergo punch-through at a sufficiently low voltage. Devices which meet the requirements necessary to serve this safeguard role include MOS transistors (with respect to their source-to-drain breakdown voltage), Zener diodes (with respect to their reverse avalanche voltage), oxide layers (with respect to their thickness and hence breakdown voltage), etc. All that is needed is that such a safeguard be able to deliver base drive to the bipolar guarding transistor at a well-defined input voltage level. Since the preferred ESD mechanism is through bipolar punch-through, it is anticipated that the triggering voltage of the backup mechanism will be slightly higher than the design (nominal) punch-through voltage of the bipolar guarding transistor. It could of course also be lower than the threshold voltage level for damage to the circuit which is to be protected.

DETAILED DESCRIPTION OF THE PREFERRED EMBODIMENT

In the Preferred Embodiment of the invention, the safeguard switch is a MOS triggering transistor coupled to the bipolar guarding transistor's base so as to turn on that guarding transistor should the latter fail to undergo punch-through at a sufficiently low voltage. The invention makes use of the fabrication control available over MOS transistors, and calls for the MOS transistor to trigger bipolar turn-on at a voltage only slightly higher than that at which the bipolar transistor is supposed to undergo punch-through. In this manner, the high-current-capacity bipolar transistor—operating in either punch-through or turned-on mode—provides the path needed to divert dangerous electrostatic build-ups.

Figure 1:
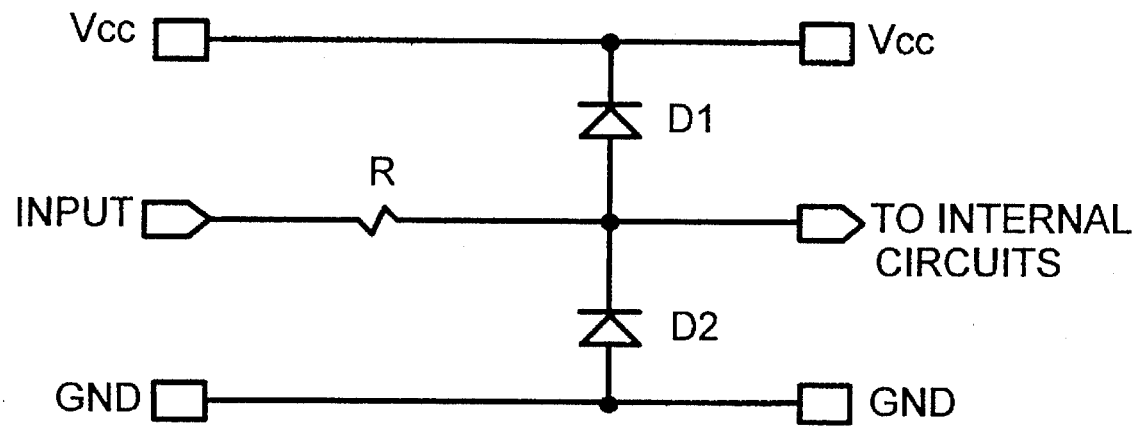
FIG. 1 is a prior art electrostatic discharge protection circuit that uses a pair of diodes and a dropping resistor to provide ESD protection.
Figure 2:
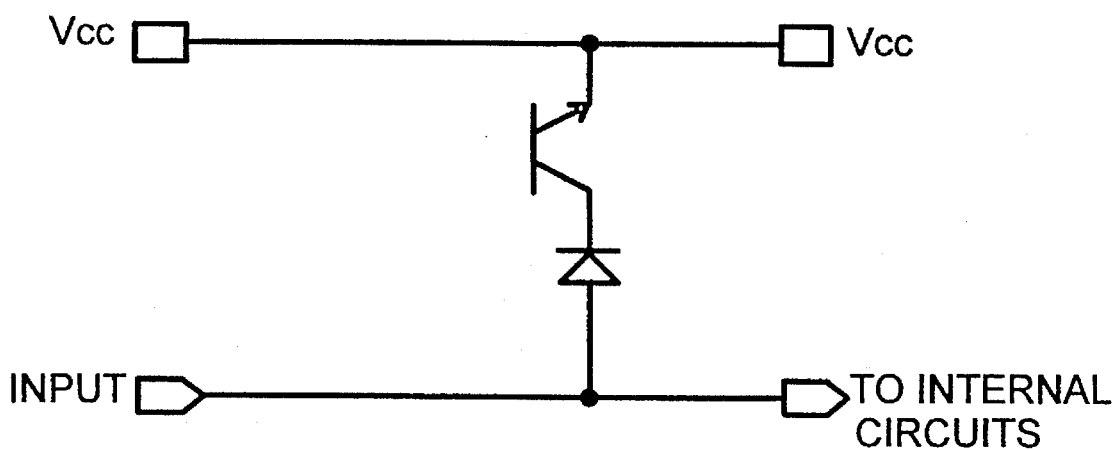
FIG. 2 depicts a prior-art diode/transistor electrostatic discharge protection circuit.
Figure 3:
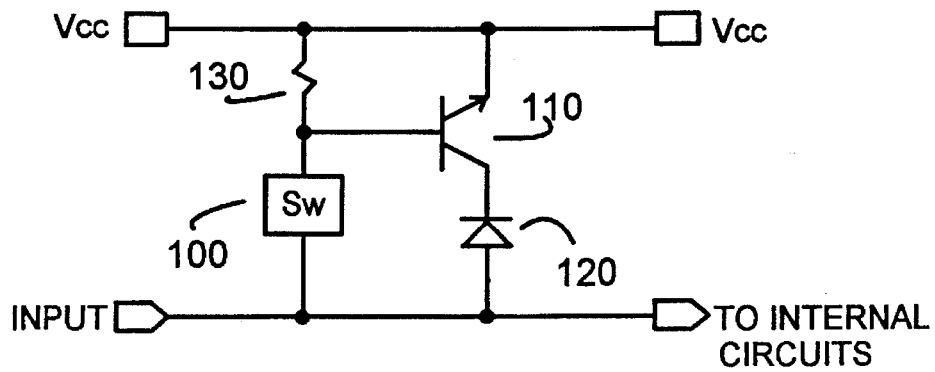
FIG. 3 is an electrostatic discharge protection circuit of the present invention.

FIG. 3 shows an electrostatic discharge protection circuit according to the present invention having a switch 100 coupled between an circuit input node and a base node of a bipolar transistor 110. A diode 120 is coupled between the input node and a collector node of the bipolar transistor 110. A resistor 130 is coupled between the base node of the bipolar transistor 110 and the high-potential power rail $V_{cc}$.

Figure 4:
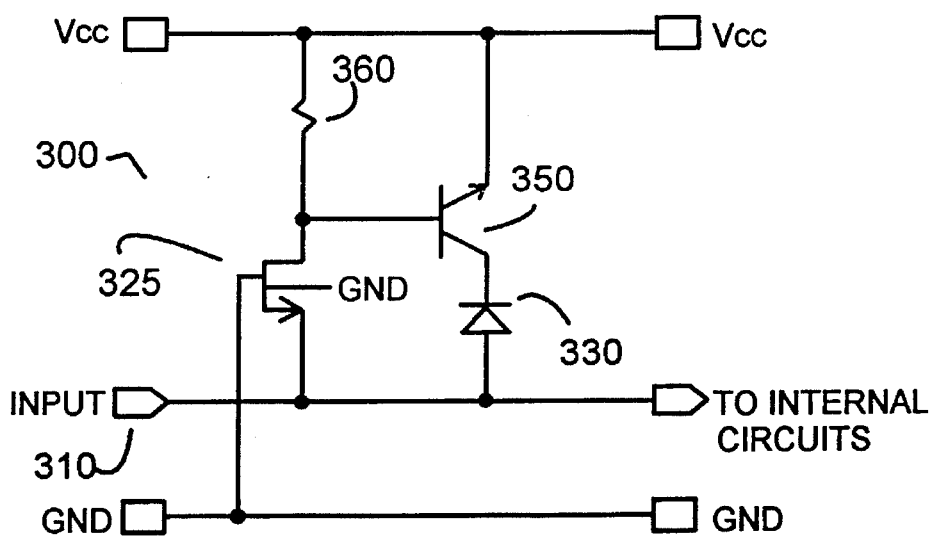
FIG. 4 is an electrostatic discharge protection circuit in accordance with the preferred embodiment of the present invention.

FIG. 4 shows an electrostatic protection circuit 300 of the present invention. In the preferred embodiment an NMOS transistor, with its bulk tied to ground, and a npn bipolar transistor are used. However, PMOS and pnp transistors may be substituted for the NMOS and npn transistors respectively.

A drain node of MOS transistor 325 is coupled directly to an input node 310 of a circuit-to-be-protected. A drain node of the MOS transistor 325 is coupled to the high-potential power rail $V_{cc}$ through a resistor 360. The drain of the MOS transistor 325 is also connected to the base node of the bipolar transistor 350. The resistor 360 typically has a value between 100 ohms and 1000 ohms. A diode 330 is connected between the input node 310 and a collector node of the bipolar transistor 350. An emitter node of the bipolar transistor 350 is coupled to the power rail $V_{cc}$.

The MOS transistor 325 has a source-to-drain punch-through voltage established by fabrication means well-known in the art. Since many circuits are damaged by overvoltages as low as 15 volts above GND (or roughly 10 volts above $V_{cc}$), the breakdown voltage of transistor 325 is designed to be slightly lower than this level. The bipolar transistor 350 is designed to have a punch-through voltage slightly lower yet; however, because of the fabrication vagaries, this punch-through voltage can actually range in the completed device from several volts below to several volts above the source-to-drain punch-through voltage of the triggering transistor 325.

Consider an example where the high-potential power rail is at 5.0 volts above ground, the MOS transistor 325 has a drain-to-source punch-through voltage of 9 volts (i.e., it will punch through when its source is at a voltage of 14 volts with respect to GND), the bipolar guarding transistor 350 undergoes punch-through at its design of 7 volts (i.e., it should and does undergo punch-through when its collector is at 12 volts with respect to GND) and a 13-volt electrostatic spike (8 volts with respect to $V_{cc}$) is applied to the input line. With a forward-bias voltage drop across the diode 330 being no more than 0.8 volts, this spike will apply sufficient voltage to the collector of the bipolar transistor 350 to cause the latter to break down, creating a discharge path to divert the electrostatic charge to power rail $V_{cc}$. The triggering transistor 325 will not be involved.

Consider another unit from the same run but where the as-fabricated punch-through voltage of the bipolar guarding transistor 350 is 11 volts, 4 volts higher than the design value (meaning that the input line must be at 16.8 volts with respect to GND before the guarding transistor will undergo punch-through). An electrostatic buildup presenting a potential of 15 volts at the input node 310 will not cause the guarding transistor 350 to break down; it will, however, cause the MOS triggering transistor 325 to conduct current from the input node to the base of guarding transistor 350. Once current flows through the MOS transistor 325, base drive current will be provided to guarding transistor 350 and will turn that transistor 350 on. The turned-on guarding transistor 350, operating in its normal activated mode, establishes a discharge path diverting the electrostatic spike to power rail $V_{cc}$.

Typically, during the period that a circuit is powered down, the high-potential power rail is connected to ground. Under these circumstances, the Preferred Embodiment circuit acts essentially as described except that with the high potential power rail at ground, the low end of the range of electrostatic spikes protected against will be five volts lower. Thus, electrostatic accumulations of 7 volts or greater coming into contact with the input node of the powered-down circuit will be discharged.

It can be seen that the electrostatic discharge protection circuit 300 is not triggered or turned on when normal data signals are applied at the input node.

Figure 3A:
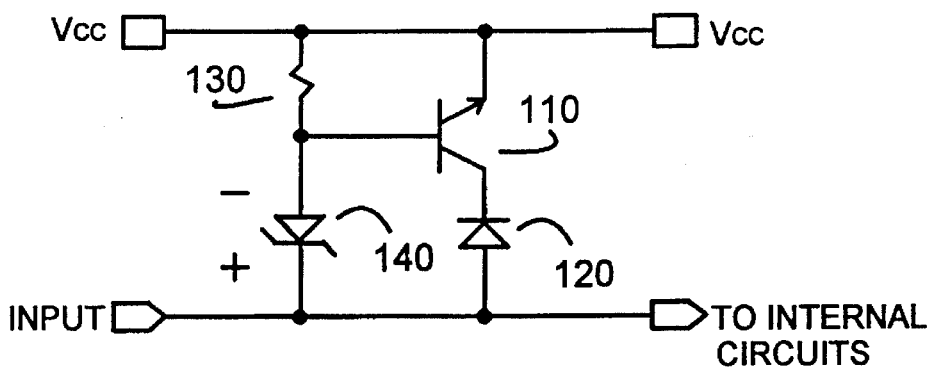
FIG. 3a is an alternative design of an electrostatic discharge protection circuit of the present invention.

The Preferred Embodiment of the present invention, as depicted in FIG. 4, is not meant to limit the subject matter claimed, but rather to set out the best mode known at present for practicing the invention. In particular, although the safeguard switch has been described as a MOS transistor, other devices may be used as the protection mechanism in the present invention. For example, a reverse-biased Zener diode 140, as shown in FIG. 3a, coupled directly between the input of the guarded circuit and the base of the bipolar guarding transistor, as illustrated in FIG. 3a, or a semiconductor controlled rectifier (SCR) could be used as the protection mechanism instead of a MOS transistor.

We claim:

1. Apparatus for protecting an electrical circuit against circuit-damaging voltage spikes, said apparatus comprising:
   a. a bipolar guarding transistor coupled between an input node of said circuit and a power rail of said circuit, and
   b. a switching means coupled between said input node and a base node of said guarding transistor,
   wherein said guarding transistor is fabricated to have a nominal collector-to-emitter punch-through voltage at a level below a threshold circuit-damage voltage level for said circuit,
   and wherein said switching means has a switch-on voltage below said threshold circuit-damage voltage level, but above said nominal collector-to-emitter punch-through voltage.

2. Apparatus of claim 1, wherein said switching means is a Zener diode that is reverse-biased when said input node is at a voltage lower than said circuit-damage voltage level.

3. Apparatus described in claim 1, further comprising a diode coupled between said input node and a collector node of said guarding transistor, said diode being oriented so as to be forward-biased when said input node is at a higher voltage than said power rail.

4. Apparatus of claim 3, wherein said base node is coupled through a resistor to an emitter node of said guarding transistor.

5. Apparatus of claim 4, wherein said switching means is a MOS transistor.

6. Apparatus of claim 5 wherein said MOS transistor is coupled between said input node of said circuit and said base node and with a gate node coupled directly to a low-potential power rail of said circuit.

7. Apparatus of claim 6 wherein said MOS transistor is an N-channel transistor.

8. Apparatus of claim 6, wherein said guarding transistor is an npn transistor.

9. An electrostatic discharge protection circuit for protecting a second circuit, wherein said second circuit has an input node, a high-potential power rail, and a low-potential power rail, said electrostatic protection circuit comprising:
   a. a MOS transistor;
   b. a bipolar transistor;
   c. a resistor; and,
   d. a diode;
   wherein a gate node of said MOS transistor is connected directly to ground, a bulk node of said MOS transistor is coupled directly to ground, and a principal current path of said MOS transistor is coupled between said input node and a base of said bipolar transistor,
   wherein said resistor is coupled between said base of said bipolar transistor and an emitter of said bipolar transistor, and said emitter is coupled directly to said high-potential power rail,
   wherein said diode is coupled between said input node and said collector of said bipolar transistor,
   wherein said bipolar transistor has a nominal collector-to-emitter punch-through voltage lower than a damage threshold voltage for said second circuit, and wherein said MOS transistor has a drain-to-source breakdown voltage slightly higher than said punch-through voltage, but lower than said threshold circuit-damage voltage.

10. The electrostatic discharge protection circuit as described in claim 9, wherein said source-to-drain breakdown voltage of said MOS transistor is approximately 9 volts.

11. The electrostatic discharge protection circuit as described in claim 9, wherein said punch-through voltage of said bipolar transistor is approximately 7 volts.

12. The electrostatic discharge protection circuit as described in claim 10, wherein said MOS transistor is an NMOS transistor.

13. A method of protecting a circuit from electrostatic discharge, said method comprising the steps of:
   a. connecting a high-current-capacity guarding transistor between an input node and a power rail of said circuit; and
   b. connecting switching means between said input node of said circuit and a control node of said guarding transistor, wherein said switching means has a switch-on voltage below a threshold circuit-damage voltage and above a nominal collector-to-emitter punch-through voltage.

14. The method as described in claim 13 wherein said switching means is a triggering transistor with a principal current path of said triggering transistor connected between said input node of said circuit and said control node of said guarding transistor.

15. The method as described in claim 14 further comprising the step of fabricating said guarding transistor so that a nominal punch-through voltage thereof is higher than an operational signal level of said circuit and lower than a damage-threshold voltage level of said circuit.

16. The method as described in claim 15 further comprising the step of fabricating said triggering transistor so that a nominal punch-through voltage thereof is higher than said nominal punch-through voltage of said guarding transistor and lower than said damage-threshold voltage level.

17. The method as described in claim 16 wherein said guarding transistor is an npn transistor.

18. The method as described in claim 17 wherein said triggering transistor is a MOS transistor.

19. The method as described in claim 18 wherein said MOS transistor is an N-channel transistor.

20. The method as described in claim 13 wherein said switching means is a Zener diode that is reverse-biased when said input node is at a voltage lower than said damage-threshold voltage level.

* * * * *